(12) United States Patent
Sharp et al.

(10) Patent No.: US 9,497,277 B2
(45) Date of Patent: Nov. 15, 2016

(54) INTEREST GRAPH-POWERED SEARCH

(71) Applicant: Highspot, Inc., Seattle, WA (US)

(72) Inventors: Oliver Sharp, Seattle, WA (US); David Wortendyke, Seattle, WA (US); Scot Gellock, Seattle, WA (US); Robert Wahbe, Seattle, WA (US); Paul Viola, Seattle, WA (US)

(73) Assignee: Highspot, Inc., Seattle, WA (US)

( * ) Notice: Subject to any disclaimer, the term of this patent is extended or adjusted under 35 U.S.C. 154(b) by 207 days.

(21) Appl. No.: 14/136,322

(22) Filed: Dec. 20, 2013

(65) Prior Publication Data

US 2014/0181204 A1 Jun. 26, 2014

Related U.S. Application Data

(60) Provisional application No. 61/745,365, filed on Dec. 21, 2012.

(51) Int. Cl.
*H04L 29/08* (2006.01)
*G06F 11/34* (2006.01)
*G06F 17/30* (2006.01)

(52) U.S. Cl.
CPC ............... *H04L 67/22* (2013.01); *G06F 11/34* (2013.01); *G06F 17/30867* (2013.01)

(58) Field of Classification Search
CPC ..... H04L 67/22–67/42; G06F 11/34–11/3495; G06F 17/30864–17/3087
See application file for complete search history.

(56) References Cited

U.S. PATENT DOCUMENTS

| | | | |
|---|---|---|---|
| 7,970,721 B2 | 6/2011 | Leskovec et al. | |
| 8,014,634 B1 | 9/2011 | Chan | |
| 2005/0267799 A1 | 12/2005 | Chan et al. | |
| 2006/0085427 A1 | 4/2006 | D'Urso | |
| 2006/0129538 A1 | 6/2006 | Baader et al. | |
| 2007/0150515 A1* | 6/2007 | Brave | G06F 17/30867 |
| 2008/0306954 A1* | 12/2008 | Hornqvist | G06F 21/6218 |
| 2009/0019026 A1* | 1/2009 | Valdes-Perez | G06F 17/30598 |
| 2009/0164431 A1 | 6/2009 | Zivkovic et al. | |
| 2010/0070488 A1* | 3/2010 | Sylvain | G06F 17/30867 707/722 |
| 2010/0146593 A1 | 6/2010 | Stahl et al. | |

(Continued)

FOREIGN PATENT DOCUMENTS

JP 2012185780 A 9/2012

OTHER PUBLICATIONS

International Search Report and Written Opinion for International Application No. PCT/US2013/076962, Mail Date Apr. 22, 2014, 11 pages.

(Continued)

*Primary Examiner* — Nicholas Taylor
*Assistant Examiner* — Clayton R Williams
(74) *Attorney, Agent, or Firm* — Perkins Coie LLP

(57) ABSTRACT

A method, which identifies information of interest within an organization, determines use data that characterizes relationships among information items within the organization, where the information items include user data and collections of information items. The method generates interest data indicating affinities among the information items based on the determined use data. After receiving a query for data regarding the information items, the method responds to the query by providing one or more results based on the generated interest data. More details are provided herein.

20 Claims, 7 Drawing Sheets

(56) References Cited

U.S. PATENT DOCUMENTS

| | | |
|---|---|---|
| 2010/0198869 A1 | 8/2010 | Kalaboukis et al. |
| 2010/0235351 A1* | 9/2010 | Iwasa ............... G06F 17/30038 707/723 |
| 2011/0107260 A1* | 5/2011 | Park ...................... G06Q 10/04 715/811 |
| 2012/0001919 A1 | 1/2012 | Lumer |
| 2012/0143859 A1 | 6/2012 | Lymperopoulos et al. |
| 2012/0278329 A1 | 11/2012 | Borggaard et al. |
| 2012/0278761 A1 | 11/2012 | John |
| 2012/0290614 A1* | 11/2012 | Nandakumar .... G06F 17/30864 707/770 |
| 2012/0310926 A1* | 12/2012 | Gannu .............. G06F 17/30702 707/723 |
| 2013/0036114 A1 | 2/2013 | Wong et al. |
| 2013/0054583 A1 | 2/2013 | Macklem et al. |
| 2013/0110813 A1* | 5/2013 | Holm ................ G06F 17/30864 707/709 |
| 2013/0218923 A1* | 8/2013 | Kaul ................. G06F 17/30864 707/769 |
| 2013/0254280 A1* | 9/2013 | Yang ..................... G06Q 50/01 709/204 |

OTHER PUBLICATIONS

Screenshot of Frequently Asked Questions page of Speaker Deck website. Taken Dec. 10, 2014 https://speakerdeck.com/faq#file_types.

Screenshot of main page of Speaker Deck website. Taken Dec. 10, 2014 https://speakerdeck.com/.

International Search Report and Written Opinion for International Application No. PCT/US2014029505, Mail Date Jul. 7, 2014, 11 pages.

* cited by examiner

FIG. 1

INTEREST GRAPH-POWERED SEARCH

CROSS-REFERENCE TO RELATED APPLICATIONS

This application claims the benefit U.S. Patent Provisional Application No. 61/745,365 filed on Dec. 21, 2012, entitled "INTEREST GRAPH-POWERED SEARCH", which is herein incorporated by reference in its entirety. This application is related to U.S. Provisional Patent Application No. 61/800,042, filed Mar. 15, 2013, entitled "INTEREST GRAPH-POWERED FEED", U.S. Provisional Patent Application No. 61/800,322, filed Mar. 15, 2013, entitled "INTEREST GRAPH-POWERED BROWSING", U.S. Provisional Patent Application No. 61/800,497, filed Mar. 15, 2013, entitled "INTEREST GRAPH-POWERED SHARING, and U.S. Provisional Patent Application No. 61/914,266, filed Dec. 10, 2013, entitled "SKIM PREVIEW," all of which are herein incorporated by reference in their entireties.

BACKGROUND

Currently, it is often very difficult inside of an organization to find the information that employees need to do their jobs. This is in contrast to consumer-targeted search such as Google or Amazon, where users can typically find the answer to their question or product of interest easily. As one motivating example, there are over 400 Million web documents containing the word "Volkswagen". Nevertheless Google returns www.volkswagen.com as the first result for the query {volkswagen}. The typical experience in enterprise search is far worse. A user may type the query {sql} and see thousands of documents containing the term "sql" in no particular order.

Both for public web search and for Amazon catalog search, term matching is only a single component of relevance. Google and Bing use document popularity (as determined by clicks and incoming web links) to boost the position of volkwagen.com to the top. Amazon similarly has product sales figures, manufacturer reputation, and ratings that can be combined with term matching.

In contrast search within and across organizations (when it exists at all) is implemented as a text retrieval problem, where each document exists only as a collection of text, and does not have popularity, rating, or activity information. In particular, these search systems have very limited data about user behavior. Due in large part to this lack of what is called "user signal", search systems rely heavily on content indexing. Indexing does a good job of identifying potentially relevant pieces of information, but a very poor job of ranking it. As a result, searches routinely come back with hundreds or thousands of results, with the desired information buried somewhere inside them. Employees within organizations, especially larger ones, routinely give up entirely on search systems and rely on alternative means to find the information they need (such as email, private repositories that they maintain, and the like).

It would be helpful to have a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

FIG. 1 is a display page illustrating a query and results page.

FIG. 6 is a block diagram illustrating some of the components that may be incorporated in at least some of the computer systems and other devices on which the facility operates and interacts with.

DETAILED DESCRIPTION

Figure 2A:
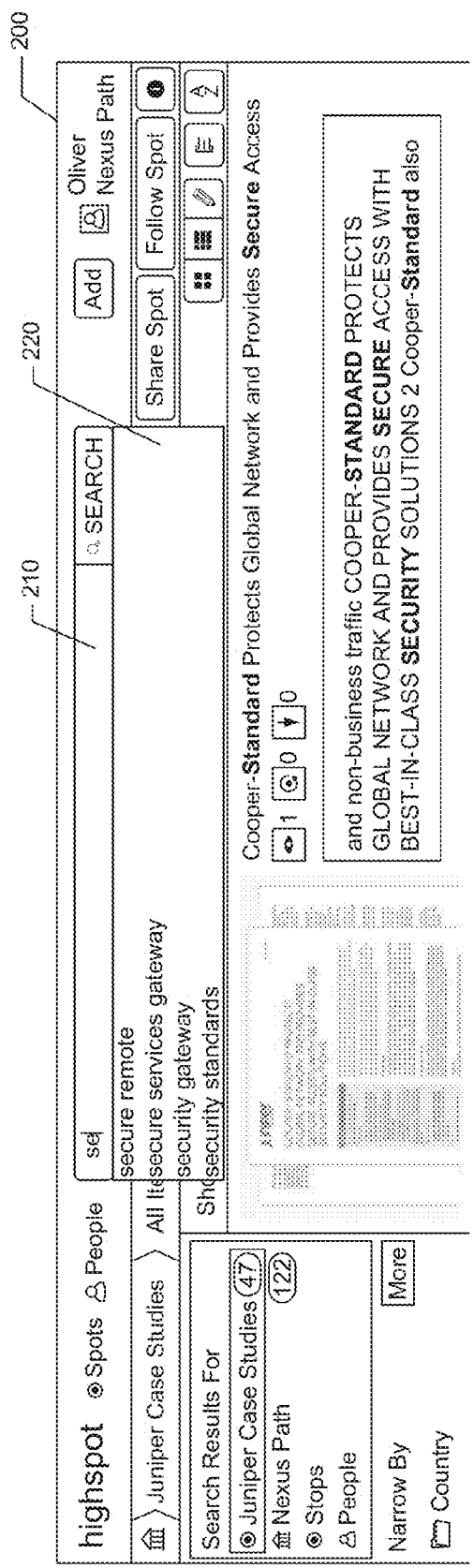
FIG. 2A is a display page illustrating a search completion feature.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

This disclosure describes the creation and use of an interest graph within an organization, such as a company, and between companies, to search for information. The organization may include a structured body of users with associated roles, each having access to a set of information items. In some cases, the organization includes a group of users on a private network sharing an internet domain. An interest graph expresses the affinity between people and information—the likelihood that a particular piece of information is of interest to a particular person. The information might be a document, a presentation, a video, an image, a web page, a report, or the like, typically referred to herein as "items" or "data items." Users' information needs can include collections of items, sections of an item, or a person.

The interest graph represents many kinds of relationships, including: between users and other users, users and items, and users and collections. The interest graph is computed using data both from the set of items and from user behavior. In some examples, there are three steps for computing the interest graph. The first step is to generate the data; the system provides mechanisms for the user to quickly browse, share, and organize items. By using those features, the users create a large amount of usage data, much of which is currently unavailable to existing information management and retrieval software. The next step is to gather the data, where the system logs user activities in a set of data structures. The third step is to compute the graph. By running a series of computations over the data gathered from users, the system computes data structures that are used for a variety of search operations. The disclosed techniques honor access restrictions that users specify for each item, so that only authorized people will see any item.

Searching

Figure 1:
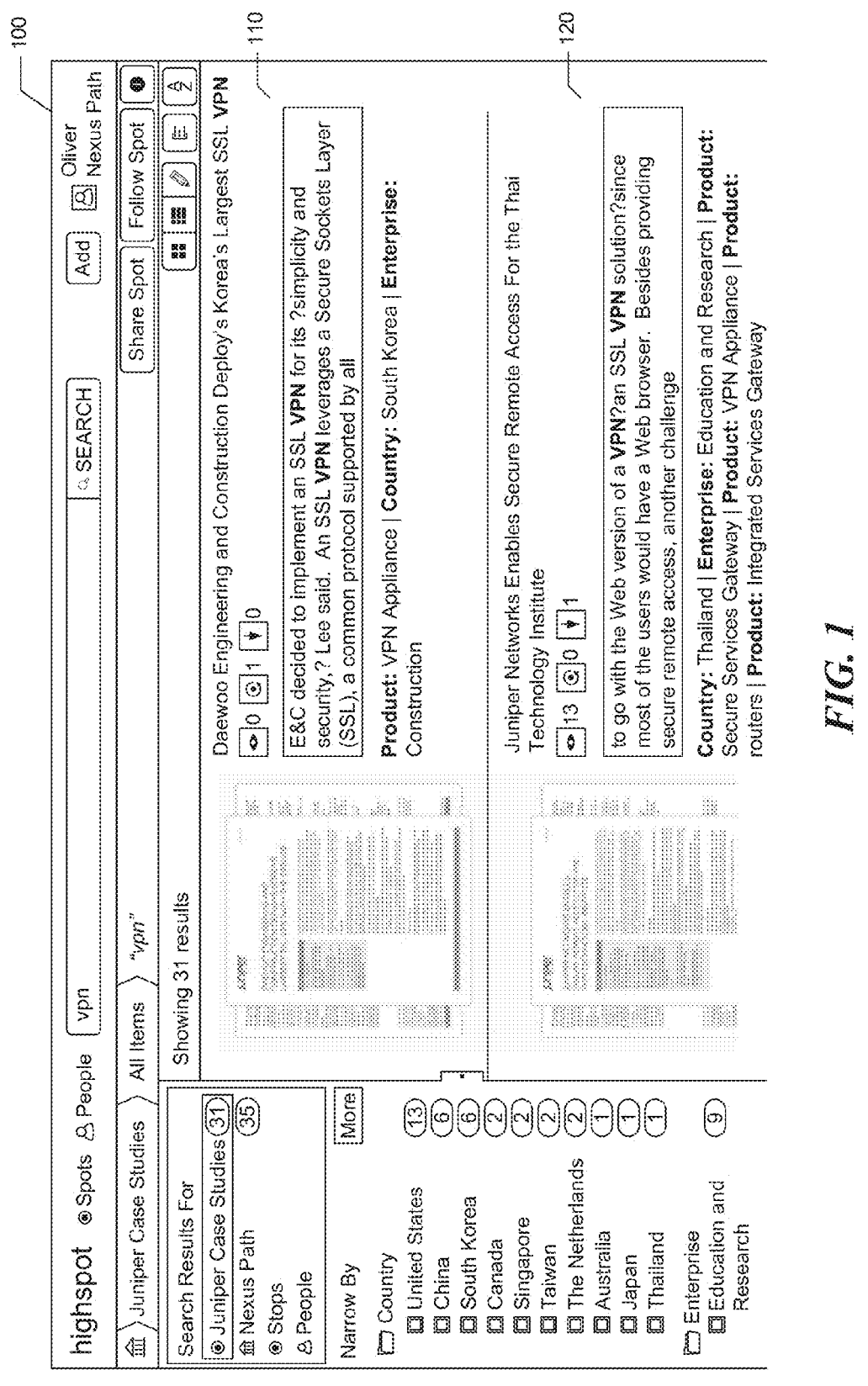

One of the most common ways that users look for information online is to type a query into a search box. The system uses the query to identify a candidate set of items, collections, and people that match it, attempt to rank order those candidates based on what is most likely to satisfy that user's request, and present the results. The system uses the interest graph to support search across items within a particular company and between multiple companies. FIG. 1 is a display page 100 illustrating a query and results page in accordance with some embodiments of the disclosed technology. In this example, a search and the set of results that have been returned by the system are displayed. In this example, a user has performed a search for "vpn" and the system has identified 31 results, including "Daewoo Engineering and Construction Deploy's Korea's Largest SSL VPN" 110 and "Juniper Networks Enables Secure Remote Access For the Thai Technology Institute" 120. The results are ranked based on how likely they are to interest the user, as explained below. For each result, the system highlights the elements of the search phrase that matched text associated with the item.

Basic Search

In a basic search, the user provides a string, and the system identifies items that the user has access to and that match the string. The items may include information which has been created by another user within the same organization (which will be referred to as an internal item) or by a user from elsewhere (an external item). The system allows items to be shared within and across organizations, and for their access to be restricted to particular sets of people.

In some examples, basic search is implemented in the system as follows:
  Determine which items are both accessible to the user and contain words or strings from the search query. This process may be performed using a software package, such as the Lucene software library supported by the Apache Software Foundation. As described below, Lucene computes and uses an inverted index that reports, for every lexeme in the search query, the items that contain that lexeme. This reported set of items is the candidate set of items.
  Compute a textual rank for each candidate item (i.e., an item in the candidate set) based on a similarity algorithm. This rank is based on the textual contents of the items and on the search phrase.
  Run a computation (i.e., a subroutine) called ItemRanker (described below) on the candidate set to assign an overall rank to each item. The computation relies on the interest graph and the textual rank to compute the overall rank.
  Present the resulting items to the user, sorted in overall rank order (highest value first).

Search Completion

Search completion is a feature that shows possible search queries while the user is typing in the search box (see FIG. 2A for an example). FIG. 2A is a display page 200 illustrating a search completion feature in accordance with some embodiments of the disclosed technology. In this example, a user has typed "se" in the search box 210 and the system has shown "secure remote," "secure services gateway," "security gateway," and "security standards" as possible search queries 220. Search completion is a very useful shortcut for users, showing them search queries that are likely to be relevant and that have a good probability of yielding useful results.

In some examples, search completion is implemented in the system as follows:
  As the user types, the system passes the partial search query to a computation called CompletionRanker (described below). CompletionRanker returns a ranked set of search completions that are most likely to be of interest to the user, based on the behavior of other users in the system and on the information in the interest graph.
  Present the ranked set of completions to the user in a dropdown.

Search Completion with Counts and Groupings

Figure 2B:
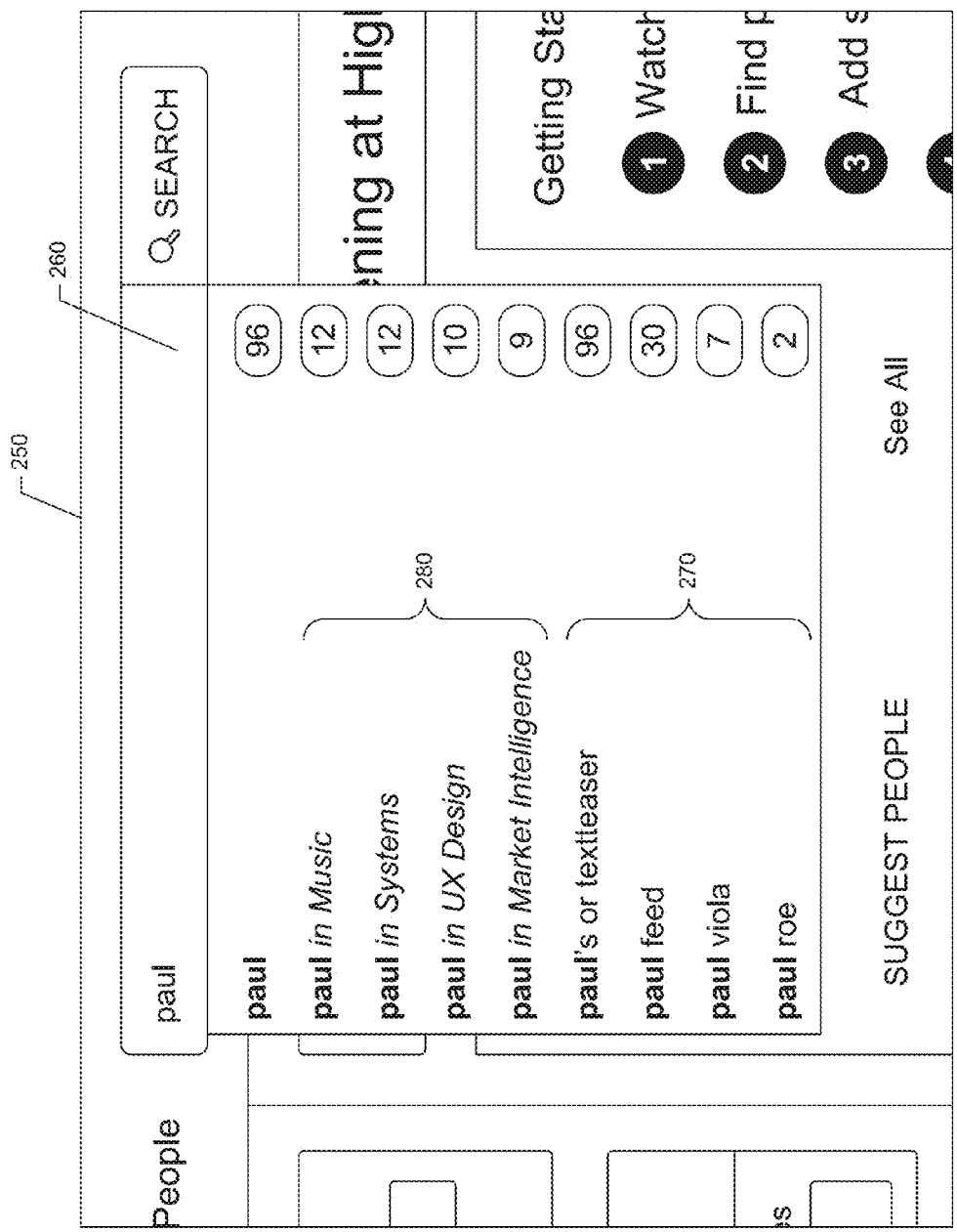
FIG. 2B is a display page illustrating a search completion and number of results feature.

Additionally the set of the completions can include information about the number of results that would be returned by each query. This information can help the user to formulate a query that will return a satisfactory number of results. Additionally some of the completions can include a speculative scoping of the search to a user specified collection, such as a spot. For example for the query {vision}, one suggestion could be {vision in the Benefits Spot (5 docs)}. Selecting this suggestion will return the 5 documents that are contained in this spot. Similarly the scope can a single user or group of users. For example {sql} could yield {sql by Robert Wahbe (20 docs)}. Selecting this would show the 20 docs uploaded by Robert that contain the term sql. FIG. 2B is a display page 250 illustrating a search completion and "number of results" feature in accordance with some embodiments of the disclosed technology. In this example, a user has typed "paul" into search box 260 and the system has shown "paul's or textteaser," "paul feed," "paul viola," and "paul roe" as possible search queries and their corresponding number of results (i.e., 96, 30, 7, and 2) 270. The system has also shown the number of results of "paul" in various collections, such as "Music" {12}, "Systems" {12}, "UX Design" {10}, and "Market Intelligence" {9} 280.

De-Duplicate Search Results

Figure 3:
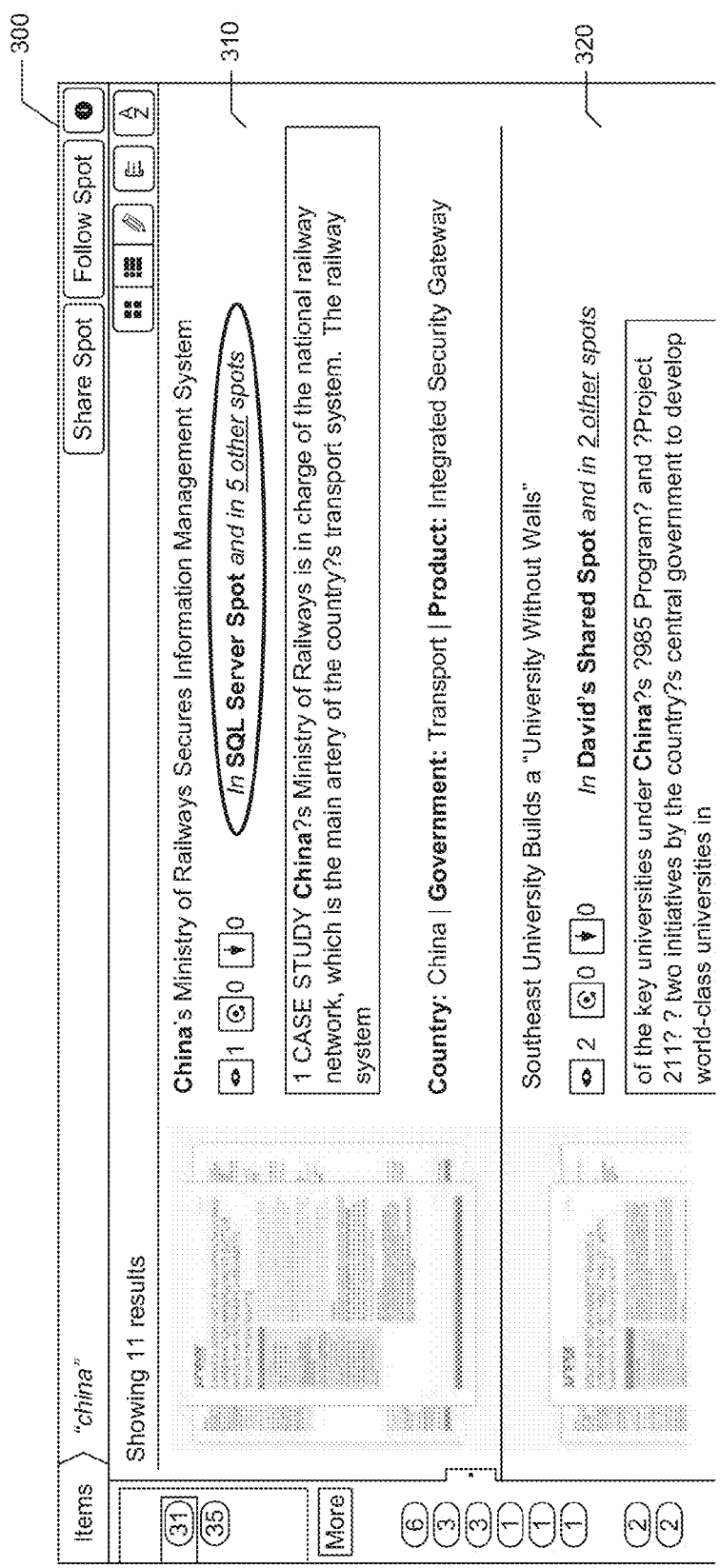
FIG. 3 is a display page illustrating de-duplication of identified search results.

For business information, it is common that the same item appear many times in many different collections of items. For example, a particularly useful presentation might be placed in an official repository, downloaded and emailed to many people, and then posted to a variety of different collections. The system identifies cases where an item has been duplicated, combines those into a single item in the results presented to the user, and uses the interest graph to choose the one most likely to interest that user. FIG. 3 is a display page 300 illustrating de-duplication of identified search results in accordance with some embodiments of the disclosed technology. FIG. 3 shows a search that has found at least two duplicated items ("China's Ministry of Railways Secures Information Management System" 310 and "Southeast University Builds a 'University Without Walls'" 320) and combined each set of duplicated items into a single instance.

Figure 4:
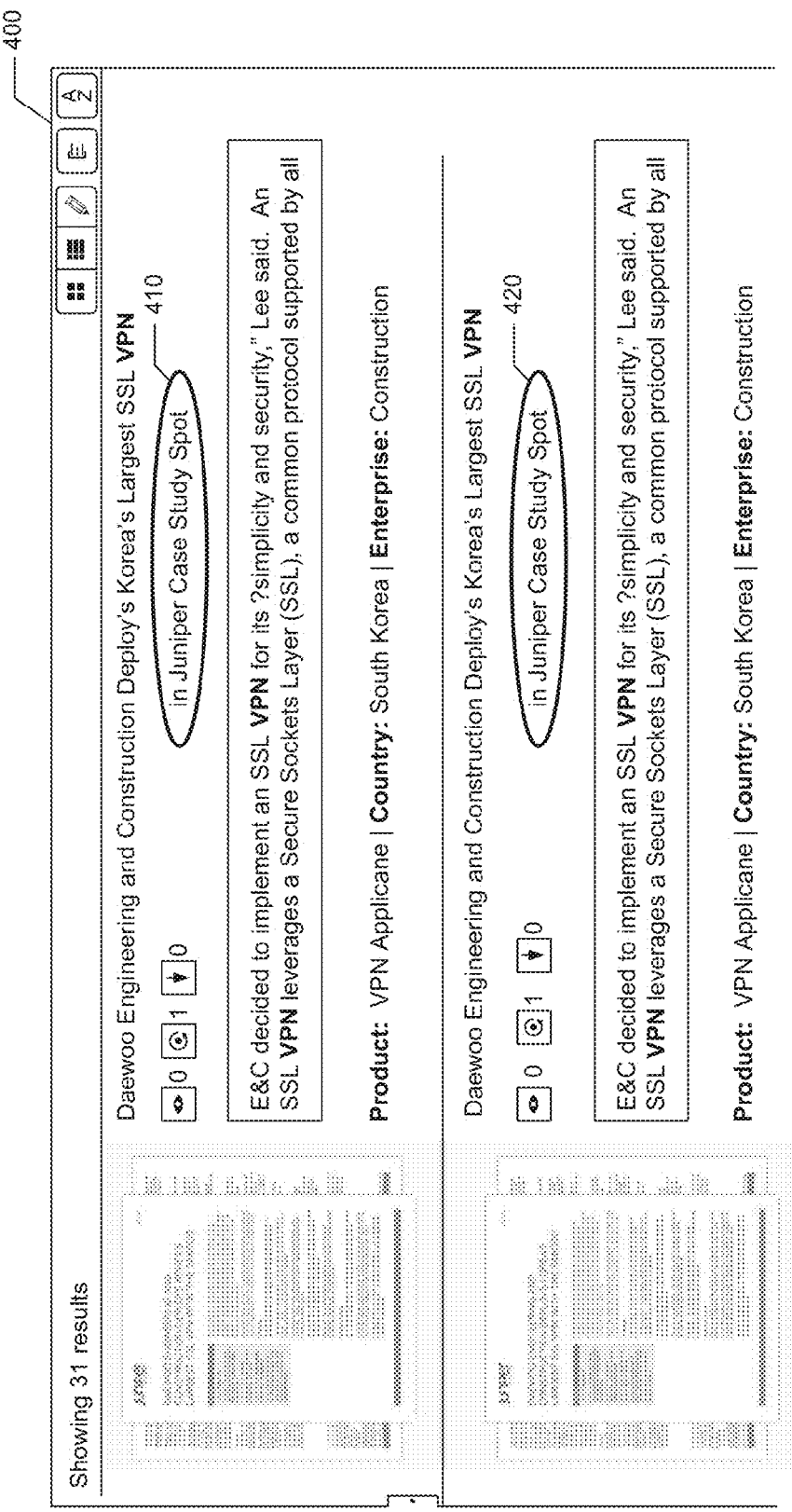
FIG. 4 is a display page illustrating the expansion of duplicated search results.

FIG. 4 is a display page 400 illustrating the expansion of duplicated search results in accordance with some embodiments of the disclosed technology. FIG. 4 shows how a single item ("Daewoo Engineering and Construction Deploy's Korea's Largest SSL VPN") can be expanded to show the copies and, for example, each copy's location 410 and 420.

In some examples, the system implements de-duplication as follows:

As the contents of items are indexed, a hash code is computed for each item based on its contents (see below for details). This hash code is, with high probability, unique across all the items. When two items have matching hash codes, they are noted in the inverted index as having identical contents.

As the items are ranked using the interest graph, identical items are combined (grouped), though their individual ranks are recorded. When the ranked search results are presented, the system presents the single item with the highest rank (as shown in FIG. 3).

If the user requests it, the system expands the collapsed items to show duplicated matches, still ranked in order of likelihood to interest the user based on the interest graph.

Other Potential Uses

There are a number of other ways that the interest graph can power improved search behavior:

Rank subsets of an item. Based on the sections of video that other users have watched, and the affinity of the current user to the other users, the system can identify the sections within the video most likely to be of interest. Similarly with other media types, like audio, or with components of structured documents, like a CAD diagram, the system can identify a section or sections thereof most likely to be of interest to a particular user. Similarly, the system might rank the pages of a document or the slides in a presentation in terms of which are most likely to interest the user based on the extent to which users have viewed portions thereof.

Search for derived information. In addition to indexing the contents of an item, the system can apply a variety of computations that derive new information based on the content, and apply the interest graph to searching that derived data. For example, the system can perform voice recognition of an audio or video stream and search the text that it has computed via the voice recognition The system may perform a dependency analysis on a CAD diagram and include dependent components in the search operation, even though they are not present in the original diagram. The system may perform image recognition and search for the names or characteristics of objects and people that have been recognized.

Instant search. The system can present search results incrementally as the user is typing, rather than waiting for them to specify a full query.

Semantic search. Search queries can be semantically analyzed using techniques like latent semantic analysis and a variety of natural language processing algorithms that perform operations, such as relationship extraction, named entity recognition, and the like. Then, the system can do specialized operations appropriate for a particular domain or a particular semantic concept. For example, if the system determined that a search applied to a set of legal cases, it might automatically detect references to legal precedents and search through them as well as through the case itself. In manufacturing, the system could identify that a number was a reference to a part and extend its search to include the supporting information for that particular part.

Creating the Interest Graph

Figure 5:
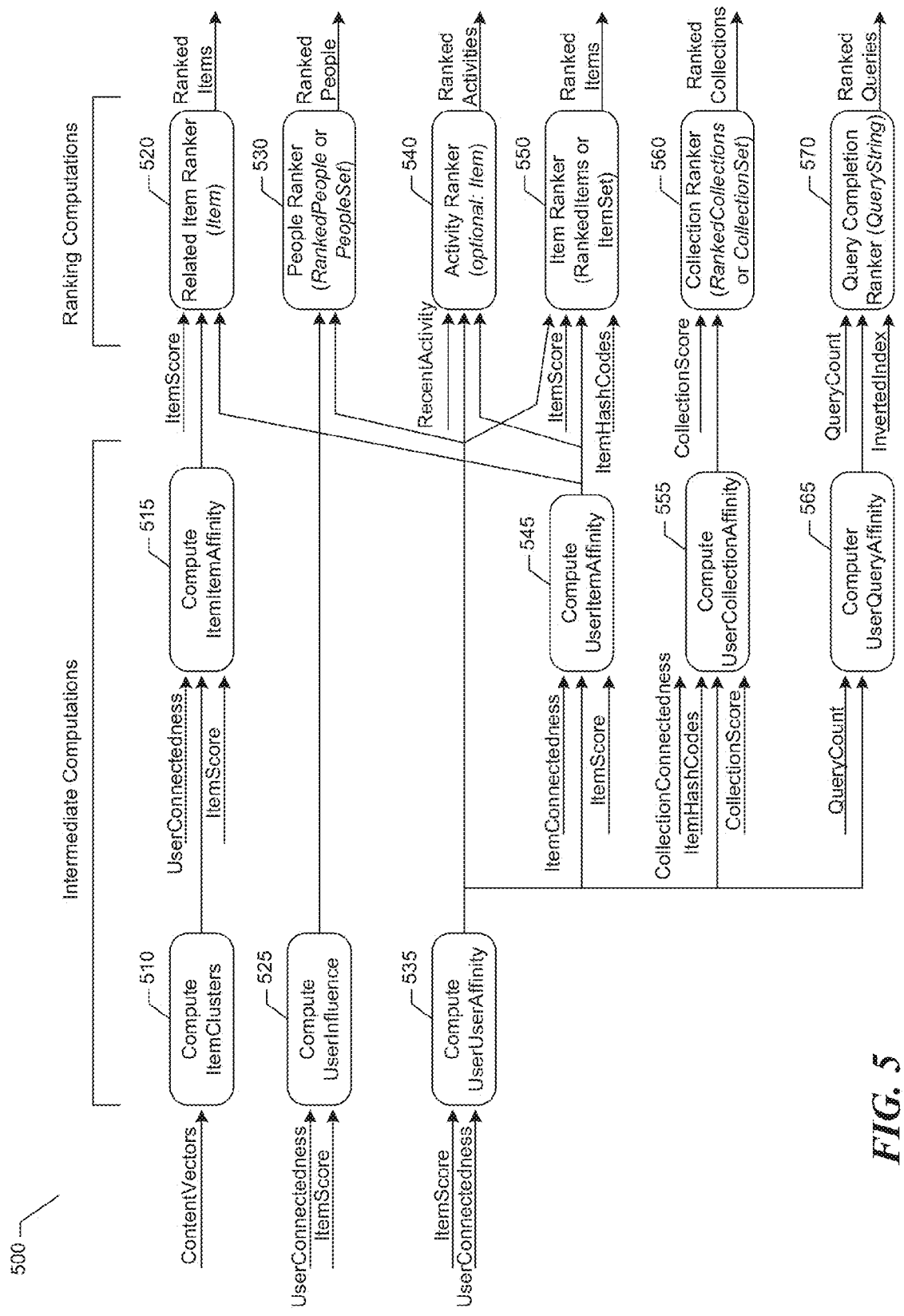
FIG. 5 is a block diagram illustrating processing of the system for creating an interest graph.

The operations above rely on the interest graph. FIG. 5 is a block diagram 500 illustrating processing of the system for creating an interest graph in accordance with some embodiments of the disclosed technology. In some examples, the process of building the interest graph includes generating the data, gathering the data, and computing the interest graph.

Step 1: Generating the Data

In some examples, an interest graph is computed from a number of different data sources and benefits greatly from having additional data to analyze. Machine learning research and practice consistently shows that accuracy improves as the number of data sources and the amount of data increases. This is referred to as user signal.

Therefore, step 1 is generating the data, which means encouraging users to engage in activities that generate signal. Historically, activities that provide the most useful data have been overly complex inside of companies, and hence have not occurred as often as they otherwise might.

For example, sharing files with others in a rich online experience (like a web site that offers a structured view, supports search, and enables browsing) has been cumbersome to set up. As a result, people often settle for simple sharing solutions, such as relying on email attachments or on keeping their files in a shared disk drive. The disclosed system provides a simple and easy-to-use sharing solution that encourages users to interact more heavily with each other's information and hence to generate more signal.

Browsing files on a web site generally involves downloading them to the local computer and viewing them in a program like Microsoft Word or PowerPoint, which is quite slow. Accordingly, users are discouraged from browsing as many items as they might otherwise do. The disclosed system provides a much faster way to browse (called "skim" preview), which offers very fast viewing of items and collections of items. Skim allows users to explore information online without requiring them to download anything or launch any applications on their machine, encouraging far more browsing. Skim preview works by tracking the way that the user slides their mouse across the item's thumbnail. Based on how far the mouse has moved horizontally across the thumbnail, a preview of that part of the item is shown. For example, if the user is running the mouse over the thumbnail for a presentation, as the mouse moves left to right, each slide of the presentation is shown in succession. By sliding the mouse back and forth, at any desired speed, the user can quickly view all the slides. Similarly, for a document, the thumbnails show each page of the document. There is an equivalent browsing experience for each type of information supported by the system. In seconds, the user can see every part of the item—it is much faster than the traditional method of downloading the file to a client application.

Another example is organizing information. The traditional approach is to use a directory structure, which provides a limited way to establish a taxonomy and to associate related files. Another approach is to use metadata tagging, where items are assigned a set of properties. These systems have been deployed extensively within companies and are generally felt to be rigid and awkward—most users resist them and the vast majority of information is never put into them. The disclosed system offers lists and folders that support dragging and dropping items into multiple places, a model that is familiar to users from other domains like organizing music into playlists. The system offers three levels of hierarchy: (1) spots, which are collections of items that can be found via a directory or search, (2) folders, which exist within a spot and optionally allow users to group a set of lists together, and (3) lists, which are simple groups of items. An item can be in zero, one, or many different lists. Users can place individual items into lists or can drag a group into a list. This is a much simpler structuring model than is traditionally used by systems like enterprise content managers. Each user can create their own hierarchy, if they wish, and can take an item from one spot and put it into another one (using an operation called respot). So users might create a spot called "Widget Marketing", which contains the marketing material for widgets. Within that spot, they might have a folder called "vertical markets" containing lists, such as "manufacturing", "media", etc. They might have another folder called "sales stage" with lists, such as "pre-sale", "proof-of-concept", "post-sale". Any piece of information can be put into any number of lists, allowing for a flexible browsing experience based on spots, folders, and lists.

The first step towards creating an effective interest graph is to provide an information management environment that makes it much easier and faster for users to engage in useful data-generating activities and generate user signal to be analyzed.

Step 2: Gathering the Data

The next step is to gather the data. Producing an accurate interest graph relies on detailed analysis of data from a variety of sources. Table 1, at the bottom of this section, lists and defines input data structures used by the system.

User Behavior

A source of data is the way that users interact with each piece of information. The system tracks actions that a user performs on any item (share, download, copy from one collection to another, recommend, comment, etc) and monitors how much time they spend looking at each part of a document, presentation, video, training program, or the like.

Traditional content systems invoke other programs when users wish to view the contents of a document—for example, such an environment might download a presentation and invoke Microsoft PowerPoint to let the user read it. What users do inside of a program like PowerPoint is usually opaque to the content manager. And, most such editing programs (e.g. word processors or presentation programs) do not track and report which parts of the file users spend time on, and how much time. Therefore user engagement with each piece of information does not generate any signal that can be analyzed.

The disclosed system presents high resolution previews and views of various document types that are available online and can be quickly browsed using skim preview—no download is required, and no software applications need to be installed or invoked on the user's machine. The system monitors views and previews, tracking how often they happen and how long the user spends looking at any part of the item.

The actions that users have taken on items and their viewing behavior are captured in the ItemScore, CollectionScore, and RecentActivity data structures. In addition, the system creates a feedback loop—whenever it presents items that might be of interest to the user, the click-through behavior is tracked in ClickThroughs.

Item Analysis

The system extracts data by analyzing each item of information:

In some examples, the system uses an information retrieval library, such as the Lucene software package, to parse text, apply Porter stemming analysis, create an inverted index, and compute a similarity score for a query string against the index. The index tracks the number of times each word appears and also records collections of words that appear together, to support searching for phrases. Each word in the index is stemmed, meaning that it is divided into its component parts. This allows, for example, a search for the word "run" to match a document that contains "running".

Note that one of ordinary skill in the art will recognize that there are a variety of other algorithms for stemming (e.g. suffix-stripping and lemmatization), assembly of the index (e.g. a suffix tree or n-gram tree), and scoring a query (e.g. compression distance, Dice's coefficient) that would also serve. This information is stored in InvertedIndex.

For each item, the system computes a content vector that expresses how many times any particular word appeared in it. The result is stored in ContentVectors.

Each piece of metadata is extracted—documents created within Microsoft Office, for example, have a section that captures tags like the author, date, description, and so forth. A similar model exists for images in JPEG format an for many other file types. The resulting <field name, value> pairs are added to InvertedIndex.

For each piece of information, the system computes a large hash function of the contents of the document (using, for example, the SHA-256 algorithm, although there are a variety of cryptographic hash functions with low collision rates that would also serve). The hash is, with high probability, unique for each piece of content in the system and allows the system to quickly recognize when the same item has been added to the system multiple times, by the same or by different users. The hashes are stored in ItemHashCodes.

Social Graph

Another valuable clue to user interest is the set of people to whom they are connected. The system computes the social graph, which captures the connections between people. Such connections can take many different forms; for example:

They may both belong to the same group of users.

They may both have similar access permissions to a collection of items. The strength of this indicator is inversely proportional to the number of other people who have similar permissions. In other words, if only two people have access to a body of documents, that is a much stronger indicator of mutual interest than if two people have access to information that is also available to hundreds or thousands of other people.

A user A may choose to follow another user B, which means that user A will be notified when user B performs certain kinds of actions. This creates an asymmetrical connection—user A is likely to be interested in something that user B cares about, but it is weaker evidence that user B will share interests with user A.

A user may own a collection of information and grant access to another.

A user may invite another user to join the service—accepting that invitation represents a stronger connection than simply receiving it.

A user may have created a link to another user.

The system examines the social graph, distilling it into UserConnectedness.

Information Graph

The system has a variety of ways that information can be categorized—it provides a hierarchy of collections and any piece of information can be in any number of those collections. One collection may have a link to another. As a result, there is also an information graph capturing the relationships between items of information. The system stores that graph in the ItemConnectedness data structure. Different types of collections imply different levels of relationship between the items.

Similarly, the system aggregates these individual relationships between items into a measure of connectedness between collections, stored in CollectionConnectedness.

Queries

The system offers search, both within a collection and across many of them. There is valuable information in the phrases that users search on, and their subsequent decisions whether or not to click through on the results presented. The system keeps track of queries that have been performed in QueryCount, the ones that are most popular (e.g., top 10, top 20%, top 15 in the past 24 hours) in PopularQueries, and the subsequent click-through decisions by users in Click-Throughs.

TABLE 1

| Input Data Structures |
|---|
| ItemScore - total activity applied to an item by each user |
| ItemScore is an array [U, I] of tuples, where U is the number of users in the system and I is the number of items. |
| Each tuple = <weightedsum, <$action_1$, $action_2$, . . . , $action_n$>, views, <$preview_1$, $preview_2$, . . . , $preview_m$>> |
| The tuple contains a count of each allowed type of action for an item (e.g. "downloaded"), a count of the number of times it is viewed, and a count of the amount of time each part of it (e.g. a page of a document) was previewed. The tuple also contains a weighted sum of these counts; weights are adjusted depending on the relative importance of each of the counts. |
| CollectionScore - total activity applied to a collection of items by each user |
| CollectionScore is an array [U, C] of element, where U is the number of users in the system and C is the number of collections. Each element is the same tuple as for ItemScore. |
| RecentActivity - a log of recent activities each user has done with every item |
| RecentActivity is an array [U, I] of tuples, where U is the number of users and I is the number of items. |
| Each tuple = <<$action_1$, $timestamp_1$>, <$action_2$, $timestamp_2$>, . . . <$action_n$, $timestamp_n$>> |
| The tuple is the set of recent actions performed by the user on the item, each with a time stamp. |
| ClickThroughs - a log of the result when each item was presented to each user |
| Clickthroughs is an array [U, I] of tuples, where U is the number of users and I is the number of items. |
| Each tuple = <<context, $position_1$, $click\_number_1$>, . . .> |
| The tuple contains the set of times this item was presented to this user. The system records the context (e.g. "search query"), the position of the item in the presented list (e.g. "the item was the third result"), and which of the selected items from that result set it was (e.g. "the item was selected second" or "the item was never selected"). |
| ContentVectors - a representation of the content of every document. In some examples, the system uses the Mahout software package developed by the Apache Software Foundation to create a normalized vector space model (VSM) representation for every item, using term-frequency inverse document frequency (TF-IDF) weighting to compute the values in each vector. Collocation-based n-gram analysis with log-likelihood ratio test improves the accuracy of the weighting. There are other algorithms for vectorizing content that would also serve. |
| ContentVectors is an array [I, T] of values, where I is the number of items and T is the number of n-gram terms that appear in any of those items. The value is a weighted count of the number of times that term appears in that item. |
| InvertedIndex - an index of a set of documents |
| In some examples, the disclosed system uses the Lucene indexing package to create an inverted index from a set of documents. This index contains every lexeme that appears in any item. For each lexeme, Lucene enumerates the set of documents that contain the lexeme. Each document is also annotated to reflect the set of individuals who are allowed to access it, and the Lucene search contains a mask to choose those items that are visible to the user. |
| ItemHashCodes - a pointer to the items corresponding to any hash code present in the system |
| The system computes a cryptographic hash value of the contents of every item. In some examples, the system uses SHA-256, but there are a variety of other algorithms that similarly compute a value for any item that has a very low probability of colliding with the value for any other. |
| ItemHashCodes is an array [H] of item lists, where H is the number of unique hash values present across all items. List contains the set of items that correspond to that hash value. |
| UserConnectedness - the degree to which each user is connected to every other user in the social graph |
| UserConnectedness is an array [U, U] of tuples, where U is the number of users. |
| Each tuple = <weightedsum, <<$strength_1$, $type_1$>, <$strength_2$, $type_2$>, . . .>> |
| The tuple enumerates the strength and type of each connection between this pair of users (from X –> Y, if the tuple is element [X, Y] of the array). The type might be "appear in the same access control list" or "X invited Y to join the community and that invitation was accepted". The strength can be the same for every connection of a particular type or it can be weighted (e.g. "the value is one divided by the number of people on the shared access control list"). The system computes a weighted sum across the connections, factoring in their strengths. |
| ItemConnectedness - the degree to which every item is connected in the information graph to every other item. |
| ItemConnectedness is an array [I, I] of tuples, where I is the number of items. The tuple has the same form as the one for UserConnectedness. |
| CollectionConnectedness - the degree to which each collection of information is connected to every other collection. |

TABLE 1-continued

Input Data Structures

CollectionConnectedness is an array [C, C] of tuples, where C is the number of collections. The tuple has the same form as the one for UserConnectedness.
QueryCount - the queries that have been executed
QueryCount is an array [Q, U] of tuples, where Q is the number of queries that have been executed on the system and U is the number of users.
Each tuple = <querystring, count, <<clickeditem$_1$, click$_1$>, <clickeditem$_2$, click$_2$>, . . .>
The tuple expresses the number of times that user U has executed query Q. querystring is the text of the query, count is the number of times the query was executed, and the next value is the set of results from those queries. Each item in the set is a pair - the item that was clicked, and its position in the clickstream of user choices (e.g. "first item clicked", "second item clicked", etc).

Step 3: Computing the Interest Graph

In some examples, the system computes the interest graph by taking the raw user signal (captured in the input data structures described in the previous section) and processing that data through a series of intermediate computations.

Each of the intermediate computations is called "Compute <X>", where <X> is the name of the output that it generates. For example, "Compute UserUserAffinity" produces the UserUserAffinity data structure. The system runs these intermediate computations at periodic intervals and the outputs are updated over time as additional user data is gathered. Table 2 enumerates the intermediate data structures that are produced by these algorithms.

TABLE 2

Intermediate Data Structures

UserInfluence - measure of how much social influence each user has on others
UserInfluence [U] is an array of real numbers representing the influence of each of the U users in the system.
<X><Y>Affinity - a measurement of the affinity for every X to every Y
These are a family of data structures that represent affinity - the likelihood of a user to be interested in another user, an item, or a collection, or the likelihood that an interest in one item implies an interest in another. In each case, affinity can be represented as a real number from 0 to 1 on a logarithmic scale, where 1 represents extremely strong predicted affinity and 0 represents none. Note that an alternative model is to make zero represent "no information," negative numbers represent negative affinity (the belief that an item of not likely to be of interest), and positive numbers represent positive affinity.
UserUserAffinity is an array [U, U] with affinity from every user to every other user
UserItemAffinity is an array [U, I] with affinity from every user to every item
UserCollectionAffinity is an array [U, C] with affinity from every user to every collection
ItemItemAffinity is an array [I, I] with affinity from every item to every other item
ItemClusters - divides the items in the system into clusters whose content is related
ItemClusters is an array [I] of tuples, where I is the number of items.
Each tuple = <<cluster$_1$, membershipweight$_1$>, <cluster$_2$, membershipweight$_2$>, . . .>
The tuple enumerates the clusters that the item is in and the weight of the item's membership to each cluster. In some examples, the system uses a non-uniform weight (so called "fuzzy clustering"), though it is also possible to make membership boolean.

When the system displays a set of values to the user, it invokes one of the ranking computations. In some examples, the names of these ranking computations takes the form "<Y> Ranker", depending on what kind of values they are ranking, where <Y> represents the kind of values being ranked (e.g., RelatedItemRanker ranks related items). Ranking computations are given an argument and then compute a set of ranked results based on that argument and on a set of other inputs.

FIG. 5 is a block diagram illustrating processing of the system in some examples. FIG. 5 shows the processing steps of the system and how the data flows through the system. Each named arrow represents an input data structure capturing raw user signal. Each rounded rectangle represents a computation. For example, "Compute ItemClusters" 510 is an intermediate computation with one input, the ContentVectors data structure. Its output (ItemClusters) is fed into the "Compute ItemItemAffinity" 515 computation, along with two other inputs—the ItemConnectedness and the ItemScore data structures.

The system uses the ranking computations to produce output that users can see. For example, suppose the user is looking at an item, and the system wants to display a set of related items next to it. The goal is to identify the items that are most likely to interest the user. For example, if a salesperson is looking at a presentation about a particular product, they might also be interested in a price sheet for the product, white papers on how to use that product most effectively, presentations and documents about related products that work with it, etc.

The system uses the ranking computation called RelatedItemRanker 520 to identify and rank related items. When the user pulls up a particular item on a web site, the system hands that item to RelatedItemRanker, which returns the ranked set of items (in a RankedItems data structure) that it has identified as being most likely to be of interest to the user. The computation relies on one input data structure—the popularity of items (ItemScore) and the results from two intermediate computations—the likelihood that the current user would be interested in any particular item (UserItemAffinity) and the degree of similarity between any two items (ItemItemAffinity).

The following data structures are used to hold groups of different types.

TABLE 3

Group Data Structures

<value>Set - a set of <values>
This family of data structures holds an unordered set of items of type <value>.
ItemSet is an array [I] of items, PeopleSet is an array [P] of people, and CollectionSet is an array [C] of collections
Ranked<value> - a set of <values>, with an associated ranking
This family of data structures holds a set of items of type <value> with an associated rank that represents an ordering. Note that ranks are real numbers, allowing the structure to both establish an ordering and to measure the "distance" between two items in terms of their rank.
RankedItems is an array [I] of ranked items, RankedPeople is an array [P] of ranked people, RankedCollections is an array [C] of collections, RankedQueries is an array [Q] of ranked queries, and RankedActivities is an array [A] of ranked activities Intermediate Computations These computations operate on input data structures and on the results produced by other intermediate computations. In each case, they produce a data structure as output with the results.

These functions or algorithms compute the degree of affinity between pairs of things. "Affinity" means the likelihood that interest in one of those items means interest in the other. Note that affinity is not symmetrical; a salesperson who is looking at a particular product description might be highly likely to look at the price sheet containing that product (among hundreds of others), but somebody looking at the price sheet is much less likely to care about any particular product's description.

Compute ItemClusters

This algorithm operates on ContentVectors, applying a clustering algorithm to compute ItemClusters that represent groups of items that have related textual content. In some examples, the system uses the Mahout software package to perform this computation, applying canopy generation to identify cluster centroids, then using k-means clustering based on the cosine of the Euclidean distance between documents as a similarity metric. One of ordinary skill in the art will recognize that other clustering algorithms can be used.

Compute ItemItemAffinity

This algorithm computes the degree of affinity between pairs of items in the system.

The inputs are ItemConnectedness (the degree to which the items are "close" in the information graph), ItemScore (the amount of interactions users have had with items), and ItemClusters (the degree to which the contents of items are related). Here is the algorithm:

```
Compute_ItemItemAffinity(ItemConnectedness, ItemScore, ItemClusters)
{
    FrequentGroups = AssociationRuleAnalysis(ItemScore)
    For every pair of items (I, J)
        ItemItemAffinity[I, J] =   A * ItemConnectedness [I, J] +
                                   B * ItemScore [*, J].weightedsum +
                                   C * number of appearances of I & J
                                       in FrequentGroups
}
```

AssociationRuleAnalysis determines which pairs of items are frequently viewed together. In some examples, the system uses the algorithm known as Apriori to determine these pairs. One of ordinary skill in the art will recognize that there are a variety of similar algorithms that could also be used. The weighting parameters A, B, and C allow the system to balance the importance of items being placed in related collections, the popularity of particular items with users, and the degree to which other users have viewed both items.

Compute UserUserAffinity 535

This algorithm computes the degree of affinity between pairs of users—the likelihood that each user is interested in what the other one does. The inputs are ItemScore (which captures how users have interacted with items) and UserConnectedness (the degree to which they are connected in the social graph). The algorithm is:

```
Compute_UserUserAffinity(ItemScore, UserConnectedness)
{
    UserBehaviorSimilarity = PearsonCorrelation(ItemScore)
    For every pair of users (I, J)
        UserUserAffinity[I, J] =   A * UserBehaviorSimilarity [I, J] +
                                   B * tanh(UserConnectedness [I, J])
}
```

The system uses, for example, the Mahout software to compute the Pearson correlation of behavior across the weighted sum of item scores. The user connectedness value is normalized into the range 0-1 using hyperbolic tangent. Then the values are weighted, to reflect the relative importance of behavior vs. the social graph. The weighting parameters A and B allow the system to balance the importance of these values. Note that one of ordinary skill in the art will recognize that numerous other algorithms can be used to compute behavioral similarity (e.g Euclidean distance or the Tanimoto Coefficient) and normalization (e.g. the logistic function or Z-scores).

Computer UserItemAffinity 545

This algorithm computes the degree of affinity between every user and every item in the system. The inputs are UserUserAffinity (from above), ItemScore, and ItemConnectedness. The algorithm is:

```
Compute_UserItemAffinity(UserUserAffinity, ItemScore,
ItemConnectedness)
{
    For every item I, for every user U {
        ActivitySum = UserInterest = 0
        For every user U2
            ActivitySum += UserUserAffinity[U, U2] * ItemScore[I,
                U2].weightedsum
        For every item I2
            UserInterest += ItemScore[I2, U] *
                tanh(ItemConnectedness [I, I2])
        UserItemAffinity[U,I] = A * ActivitySum + B * UserInterest
    }
}
```

The system computes the sum of the activity that other users have performed on the item (weighted by affinity to those users) and the sum of item activities that the current user has performed (weighted by the affinity of the current item to those other items). Those two values are combined in a weighted sum, based on the relative importance of behavior vs. item connectivity. In some examples, connectedness is normalized using hyperbolic tangent, but one of ordinary skill in the art will recognize that other algorithms could be used.

Compute UserCollectionAffinity 555

This algorithm computes the degree of affinity between every user and every collection, where a collection is a grouping of items. Note that collections can overlap, can be organized into a hierarchy, or can be disjoint—the model works in any of those cases. The inputs are UserUserAffinity (from above), CollectionConnectedness (the degree to which collections are connected), ItemHashCodes (the hash values of every item), and CollectionScore (the activities user have performed on each collection). The algorithm is:

```
Compute_UserCollectionAffinity(UserUserAffinity,
CollectionConnectedness,
                               ItemHashCodes, CollectionScore)
{
    For every collection C, for every collection C2 {
        For every item I in C, for every item I2 in C2
            if (ItemHashCode[I] = ItemHashCode[I2])
                CollectionSimilarity [C, C2] += SharedItemWeight
    }
    For every collection C, for every user U {
        ActivitySum = UserInterest = 0
        For every user U2
            ActivitySum += UserUserAffinity[U, U2] *
            CollectionScore[C, U2].weightedsum
        For every collection C2
            UserInterest += CollectionScore[C2, U] *
                (tanh(CollectionConnectedness [C, C2]) +
                    CollectionSimilarity [C, C2])
        UserCollectionAffinity[U,C] = A * ActivitySum + B *
        UserInterest
    }
}
```

The system computes the frequency with which the same item appears in every pair of collections, using a constant weight. The system then computes the sum of the activity other users have performed on the collection (weighted by the affinity to those users) and the sum of collection activities that the current user has performed (weighted by the affinity of the current collection to those collections based on both behavior and similarity of content). Note that connectedness is normalized using hyperbolic tangent, but other algorithms could be used. These values are then combined in a weighted sum, where the weights reflect the relative importance of user behavioral similarity vs. structural relationships and similarity of content.

Compute UserQueryAffinity 565

This algorithm computes the degree of affinity between every user and every query that has been executed on the system. The inputs are UserUserAffinity (from above) and QueryCount (a summary of the queries that have been executed by each user). The algorithm is:

```
Compute_UserQueryAffinity(UserUserAffinity, QueryCount)
{
    For every query Q, for every user U {
        ActivitySum = 0
        For every user U2
            ActivitySum += UserUserAffinity [U, U2] *
            QueryCount[Q, U2].count
        UserQueryAffinity[Q, U] = A * ActivitySum
    }
}
```

The system computes the sum of the number of times other users have executed this particular query, weighted by the affinity with that other user. The result is then multiplied by a weight to compute affinity for this user and the query.

Compute UserInfluence 525

This algorithm computes the amount of influence that each User has within the community of users on the system. Its inputs are UserConnectedness (the degree of connectivity in the social graph), and ItemScore. The algorithm is:

```
Compute_UserInfluence(UserConnectedness, ItemScore)
{
    For every user U, for every user U2
        UserInfluence[U] += A * UserConnectedness.weightedsum[U,
        U2]
    For every user U, for every item I that user U was responsible for
    creating
        For every user U2
            UserInfluence[U] += B * ItemScore[I, U2].weightedsum
}
```

The system computes a weighted sum of how connected other users are to a particular user, and for how much activity has been generated by the items that the particular user created.

Ranking Computations

The ranking computations produce ranked lists of items; a typical use for the ranking computations is to produce lists that are displayed to users in various contexts. For example, ItemRanker is used in deciding which items to display to users as the result of a search query. ItemRanker takes candidate items that might match the query, and orders them appropriately.

Each ranking computation is invoked on an input. Using that input and data structures that are passed to it (per the workflow in FIG. 5), the computation produces a ranked set as the output.

Related Item Ranker 520

This algorithm is invoked on an item and also gets ItemScore, ItemItemAffinity, and UserItemAffinity. The algorithm is:

```
RelatedItemRanker(Item, ItemScore, ItemItemAffinity, UserItemAffinity)
{
    For each item I
        Score = 0
        For each user U
            Score += ItemScore[I, U].weightedsum
        RankedItems[I].rank = (A * Score) * (1 +
        ItemItemAffinity[Item, I]) +
                        (B * UserItemAffinity[CurrentUser, I])
}
```

The system finds the items most related to Item by computing a weighted sum. The factors are the total amount of user activity against other items, weighted by the affinity of those other items to this one, and the current user's affinity to the item.

Activity Ranker 540

When this algorithm is invoked, it is optionally given an item and also gets RecentActivity (the set of activities that have recently been performed on the system, such as the set of activities performed during the last year, month, week, day, hour, or portion thereof), UserUserAffinity, and UserItemAffinity. If an item is provided, it returns the set of activities that have been performed on that item, ranked in terms of how likely they are to interest the current user. If no item is provided, it returns the list of activities on any item in the system, ranked in terms of how likely they are to interest the current user. The algorithm is:

```
ActivityRanker(optional; Item, RecentActivity, UserUserAffinity,
UserItemAffinity)
{
    if Item was provided
        RankedActivities = set of activities in RecentActivity performed
            on Item
    else
        RankedActivities = RecentActivity
    For each activity A in RankedActivities
        RankedActivities[A].rank = B * ActivityValue(A) *
                        (C * (1 + UserUserAffinity[CurrentUser,
                        A.user])) *
                        (D * (1 + UserItemAffinity[CurrentUser,
                        A.item]))
}
```

The system chooses a candidate set of activities. For each activity in the candidate set of activities, the system computes a ranking using a weighted product of the intrinsic interest for that type of activity, the affinity of the current user with the user who performed the activity, and the affinity of the current user for the item on which the activity was performed.

Item Ranker 550

This algorithm is invoked on a set of items, which is either unranked (an ItemSet) or already ranked with a preliminary ranking (a RankedItems set) and also gets ItemScore, ItemHashCodes, and UserItemAffinity. The algorithm is:

```
ItemRanker(InputSet, ItemScore, ItemHashCodes, UserItemAffinity,
UserUserAffinity)
{
    Remove duplicate items from InputSet (using ItemHashCodes)
    For every item I in InputSet
        For every user U
            Score += A * ItemScore[I, U] * (1 +
                UserUserAffinity[CurrentUser,U])
            RankedItems[I].rank = (B * Score) * (C * (1 +
                UserItemAffinity[I, CurrentUser]))
            If InputSet is ranked
                RankedItems[I].rank *= D * InputSet[I].rank
}
```

The system computes the sum of user actions against each item in the set, weighted by the affinity of the current user to the other users and then computes the weighted product of that sum, the affinity of the user to the item, and the existing rank of each item (if it was provided). The weights reflect the relative importance of user behavior directly against the items vs. the predictability of user interest vs. the effectiveness of the original input ranking. The output is a ranking for each unique item in the set.

Collection Ranker 560

This algorithm is invoked on a set of collections, which is either unranked (a CollectionSet) or ranked (a RankedCollections set) and also gets CollectionScore. The algorithm is:

```
CollectionRanker(InputSet, CollectionScore, UserUserAffinity,
UserCollectionAffinity)
{
    For every collection C in InputSet {
        Score = 0
        For every user U
            Score += A * CollectionScore[C, U] * (1 +
                UserUserAffinity[CurrentUser, U])
        RankedCollections[C].rank =    (B * Score) *
                                       (D * (1 +
                                       UserCollectionAffinity[I,
                                       CurrentUser))
        if InputSet is ranked
            RankedCollections[C].rank *= E *
                InputSet[C].rank
    }
}
```

The system computes the sum of user actions against each collection, weighted by the affinity of the current user to the other users and then computes the weighted product of that sum, the affinity of the user to the collection, and the existing rank of each collection (if it was provided). The weights reflect the relative importance of user behavior directly against the collections vs. the predictability of user interest vs. the effectiveness of the original collection ranking. The output is a ranking for each collection in the input set.

People Ranker 530

This algorithm is invoked on a set of people, which is either unranked (a PeopleSet) or ranked (a RankedPeople set) and also gets UserUserAffinity and UserInfluence. The algorithm is:

```
PeopleRanker(InputSet, UserUserAffinity, UserInfluence)
{
    For every user U in InputSet
        RankedPeople[U].rank = (A * UserInfluence[U]) *
                            (B * (1 +
                            UserUserAffinity[CurrentUser,
                            U]))
        If InputSet is ranked
            RankedPeople[U].rank *= C * InputSet[U].rank
}
```

For each of the users being ranked, the system computes the weighted product of their influence on other users, the affinity of the current user to the other users, and the existing rank of that user (if it was provided). The weights reflect the relative importance of influence, affinity, and the effectiveness of the original ranking. The output is a ranking for each user in the input set.

Query Completion Ranker 570

This algorithm is invoked on a partial query string, and computes the set of completions for it (suggested full queries the user might have in mind) and also gets QueryCount, UserQueryAffinity, and the InvertedIndex. This algorithm returns up to COMPLETION_MAX ranked query completions. COMPLETION_MAX may be defined by a user or an administrator of the system. The algorithm is:

```
QueryCompletionRanker(QueryPrefix, QueryCount, InvertedIndex)
{
    RankedQueries = set of queries in QueryCount that begin with
        QueryPrefix
            rank for query Q =       (A *
                                     QueryPrefix[Q].count) +
                                     (B * (1 +
                                     UserQueryAffinity[Q,
                                     CurrentUser]))
    if (number of queries in RankedQueries < COMPLETION_MAX) {
        QueryLexemes = set of lexemes in InvertedIndex that begin with
            QueryPrefix
        Sort QueryLexemes by the number of times the lexeme appears
            in the index
        Copy from QueryLexemes into RankedQueries until you reach
            COMPLETION_MAX or have copied them all. Assign
            each the rank
            A * (count of appearances of lexeme in index)
    }
}
```

The system computes query completions from the set of queries that have already been executed and from textual analysis of the inverted index. In some cases, the system biases towards the former, but fills out the potential query list from the latter as needed to reach the desired number of completions. The rank for previously executed queries is a weighted sum of the number of times the query has been executed and the affinity of the current user to each query. The rank for matching lexemes is the count of that lexeme's appearances, weighted accordingly. The output is a ranked set of query completions.

Figure 6:
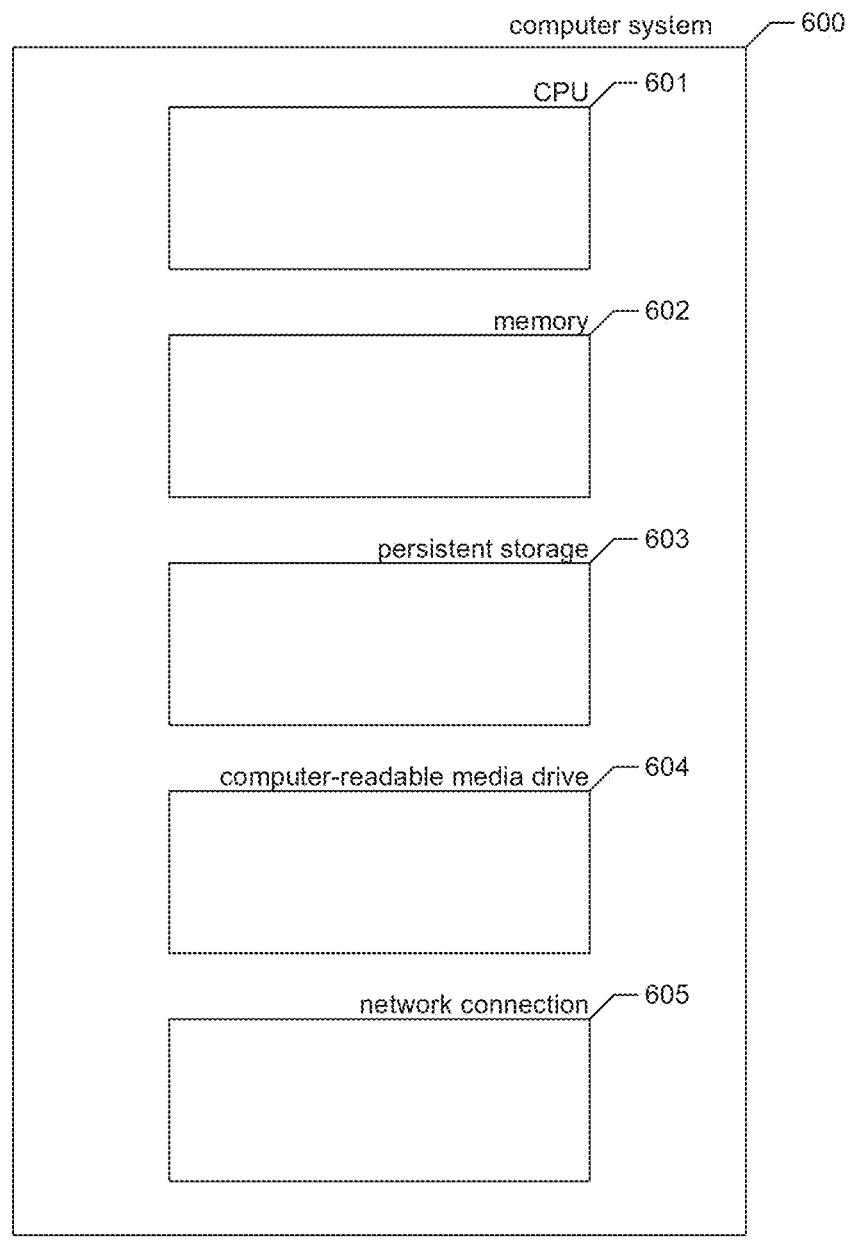

FIG. 6 is a block diagram illustrating some of the components that may be incorporated in at least some of the computer systems and other devices on which the system operates and interacts with in some examples. In various examples, these computer systems and other devices 600 can include server computer systems, desktop computer systems, laptop computer systems, netbooks, tablets, mobile phones, personal digital assistants, televisions, cameras, automobile computers, electronic media players, and/or the like. In various examples, the computer systems and devices include one or more of each of the following: a central processing unit ("CPU") 601 configured to execute computer programs; a computer memory 602 configured to store programs and data while they are being used, including a multithreaded program being tested, a debugger, the facility, an operating system including a kernel, and device drivers; a persistent storage device 603, such as a hard drive or flash drive configured to persistently store programs and data; a computer-readable storage media drive 604, such as a floppy, flash, CD-ROM, or DVD drive, configured to read programs and data stored on a computer-readable storage medium, such as a floppy disk, flash memory device, a CD-ROM, a DVD; and a network connection 605 configured to connect the computer system to other computer systems to send and/or receive data, such as via the Internet, a local area network, a wide area network, a point-to-point dial-up connection, a cell phone network, or another network and its networking hardware in various examples including routers, switches, and various types of transmitters, receivers, or computer-readable transmission media. While computer systems configured as described above may be used to support the operation of the facility, those skilled in the art will readily appreciate that the facility may be implemented using devices of various types and configurations, and having various components. Elements of the facility may be described in the general context of computer-executable instructions, such as program modules, executed by one or more computers or other devices. Generally, program modules include routines, programs, objects, components, data structures, and/or the like configured to perform particular tasks or implement particular abstract data types and may be encrypted. Moreover, the functionality of the program modules may be combined or distributed as desired in various examples. Moreover, display pages may be implemented in any of various ways, such as in C++ or as web pages in XML (Extensible Markup Language), HTML (HyperText Markup Language), JavaScript, AJAX (Asynchronous JavaScript and XML) techniques or any other scripts or methods of creating displayable data, such as the Wireless Access Protocol ("WAP").

The following discussion provides a brief, general description of a suitable computing environment in which the invention can be implemented. Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. In some cases, various steps in the algorithms discussed herein may be added, altered, or removed without departing from the disclosed subject matter. Those skilled in the art will appreciate that features described above may be altered in a variety of ways. For example, the order of the logic may be rearranged, sublogic may be performed in parallel, illustrated logic may be omitted, other logic may be included, etc.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

We claim:

1. A computer-implemented method of identifying information of interest within an organization, the method comprising:
   determining use data that characterizes relationships among information items within an organization,
      wherein the information items include user data and collections of information items, and
      wherein the organization includes a structured body of users with associated roles within the organization and who have access to the information items;
   generating interest data indicating affinity among the information items based on the determined use data, wherein the generating comprises:
      identifying pairs of items that are frequently viewed together, each pair of items comprising a first item of the pair of items and a second item of the pair of items,
      for each identified pair of items that are frequently viewed together,
         determining an itemconnectedness score for the pair of items,
         determining an itemscore for the second item of the pair of items, and
         determining a number of appearances of the first item of the pair of items and the second item of the pair of items among the identified pairs of items that are frequently viewed together;
   receiving a query for data regarding the information items;
   identifying one or more results based on the generated interest data;
   ranking the identified one or more results; and
   responding to the query by providing one or more of the ranked results.

2. The computer-implemented method of claim 1,
   wherein the information items include profiles of the users, a document, or a portion of a document, and
   wherein the organization is a business enterprise or a legal entity.

3. The computer-implemented method of claim 1, wherein
   a relationship between a user and an information item corresponds to an activity performed by the user on the information item,
   the activity is querying, browsing, opening, viewing, editing, critiquing, bookmarking, liking, sharing, downloading, collecting, or curating the information item, and
   determining the use data includes tracking the activity.

4. The computer-implemented method of claim 3, wherein tracking the activity is performed using a web browser without downloading external software or documents.

5. The computer-implemented method of claim 1, wherein a relationship between two users corresponds to:
   an organizational relationship between the two users with respect to the roles of the two users with the organization, an activity performed by the two users together within the organization, or a pair of relationships respectively between the two users and the same information item.

6. The computer-implemented method of claim 1, wherein responding to the query comprises:
combining multiple, similar results into one result;
ordering multiple results by—
a query matching score,
a popularity of an information item,
a popularity of a collection of information items,
an authority of a user,
or the interest data, and
presenting the multiple results based on the ordering.

7. The computer-implemented method of claim 6, further comprising determining the popularity of an information item based on
a number of activities performed on the information item,
an authority of users who performed activities on the information item, or
a popularity of collections of information items to which the information item belongs.

8. The computer-implemented method of claim 6, further comprising determining the authority of a user based on a number of activities performed on information items created by the user.

9. The computer-implemented method of claim 6, further comprising determining the popularity of a collection of information items based on a number of activities performed on the information items in the collection.

10. The computer-implemented method of claim 1, further comprising extending a portion of the received query using the interest data before responding to the extended query.

11. The computer-implemented method of claim 1, further comprising determining an affinity between a first user and a second user based on one or more of:
a relationship between the first and second users, and
an interest indicated by the first user with respect to the second user.

12. The computer-implemented method of claim 1, further comprising determining an affinity between a first user and an information item based on—
an affinity between the first user and a second user and a relationship between the second user and the information item, or
an affinity between the first user and a collection to which the information item belongs.

13. The computer-implemented method of claim 1, further comprising determining an affinity between a user and a collection of information items based on a relationship between the user and the collection.

14. The computer-implemented method of claim 1, further comprising determining additional use data characterizing relationships among users and information items across the organization and at least one other, independent organization.

15. A system, having memory and at least one processor, to identify information items of interest within an organization, wherein the organization includes a group of users on a private network and sharing an internet domain, the system comprising:
a component configured to gather use data that characterizes relationships among the information items within the organization,
wherein the information items include user data and collections of information items;
a component configured to compute interest data indicating affinity among the information items based on the gathered use data to generate interest graph data structures, wherein the component configured to compute comprises:
a component configured to identify pairs of items that are frequently viewed together, each pair of items comprising a first item of the pair of items and a second item of the pair of items,
a component configured to, for each identified pair of items that are frequently viewed together,
determine an itemconnectedness score for the pair of items,
determine an itemscore for the second item of the pair of items, and
determine a number of appearances of the first item of the pair of items and the second item of the pair of items among the identified pairs of items that are frequently viewed together,
wherein each interest graph data structure expresses the affinity between at least one user and one information item, and
wherein the affinity represents a likelihood that the one information item is of interest to the one user;
a component configured to:
receive a query for data regarding the information items,
identify one or more results based on the computed interest data,
rank the identified one or more results, and
respond to the query by providing one or more of the ranked results,
wherein each of the components comprises computer-executable instructions stored in the memory for execution by the at least one processor.

16. The system of claim 15 wherein the user data includes user profile data having access control data, and wherein the component configured to receive the query provides only results for which a user has access control privileges.

17. A method, performed by a computing system having a processor, the method comprising:
collecting user data including: querying, clicking, browsing, viewing, skimming, commenting, liking, sharing, downloading data items, or any combination thereof;
analyzing the user data to create an interest graph representing:
an affinity between users,
an affinity between groups of users,
an affinity between queries,
an affinity between data items, and
an affinity between collections of data items,
wherein creating the interest graph comprises:
identifying pairs of items that are frequently viewed together, each pair of items comprising a first item of the pair of items and a second item of the pair of items,
for each identified pair of items that are frequently viewed together,
determining an itemconnectedness score for the pair of items,
determining an itemscore for the second item of the pair of items, and
determining a number of appearances of the first item of the pair of items and the second item of the pair of items among the identified pairs of items that are frequently viewed together; and, reordering results returned from information retrieval using two or more properties,
wherein the properties include: a text matching score, a data item's overall popularity, author authority, user-item affinity, user-user affinity, and user-collection affinity.

18. A computer-readable medium, that is not a transitory, propagating signal, carrying instructions, which when executed by at least one data processor, cause the at least one data processor to perform a method for identifying information of interest within an organization, the method comprising:
determining use data that characterizes relationships among information items within an organization,
wherein the information items include user data and collections of information items, and
wherein the organization includes a structured body of users with associated roles within the organization and who have access to the information items;
generating interest data indicating affinity among the information items based on the determined use data, wherein the generating comprises:
identifying pairs of items that are frequently viewed together, each pair of items comprising a first item of the pair of items and a second item of the pair of items,
for each identified pair of items that are frequently viewed together,
determining an itemconnectedness score for the pair of items,
determining an itemscore for the second item of the pair of items, and
determining a number of appearances of the first item of the pair of items and the second item of the pair of items among the identified pairs of items that are frequently viewed together;
receiving a query for data regarding the information items;
identifying one or more results based on the generated interest data;
ranking the identified one or more results; and
responding to the query by providing one or more of the ranked results.

19. The computer-readable medium, that is not a transitory, propagating signal, of claim 18, wherein a relationship between two users corresponds to:
an organizational relationship between the two users with respect to the roles of the two users with the organization,
an activity performed by the two users together within the organization, or
a pair of relationships respectively between the two users and the same information item.

20. The computer-readable medium, that is not a transitory, propagating signal, of claim 18, wherein responding to the query comprises:
combining multiple, similar results into one result;
ordering multiple results by—
a query matching score,
a popularity of an information item,
a popularity of a collection of information items,
an authority of a user,
or the interest data, and
presenting the multiple results based on the ordering.

* * * * *